(12) United States Patent
Cammarota et al.

(10) Patent No.: US 10,547,448 B2
(45) Date of Patent: Jan. 28, 2020

(54) CONFIGURATOR KEY PACKAGE FOR DEVICE PROVISIONING PROTOCOL (DPP)

(71) Applicant: QUALCOMM Incorporated, San Diego, CA (US)

(72) Inventors: Rosario Cammarota, San Diego, CA (US); Jouni Kalevi Malinen, Tuusula (FI); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 15/648,437

(22) Filed: Jul. 12, 2017

(65) Prior Publication Data

US 2018/0109381 A1    Apr. 19, 2018

Related U.S. Application Data

(60) Provisional application No. 62/410,309, filed on Oct. 19, 2016.

(51) Int. Cl.
*H04L 9/26* (2006.01)
*H04L 9/08* (2006.01)
*H04W 12/04* (2009.01)

(52) U.S. Cl.
CPC .......... *H04L 9/0894* (2013.01); *H04L 9/0819* (2013.01); *H04L 9/0838* (2013.01); *H04W 12/04* (2013.01)

(58) Field of Classification Search
CPC ... H04L 9/0819; H04L 9/0838; H04L 9/0894; H04L 9/08; H04W 12/04
See application file for complete search history.

(56) References Cited

U.S. PATENT DOCUMENTS 8,650,397 B2 * 2/2014 Haddad ............... H04L 45/60
713/168
2008/0008116 A1 1/2008 Buga et al.
(Continued)

FOREIGN PATENT DOCUMENTS

WO    2015094326    6/2015

OTHER PUBLICATIONS

"PCT Application No. PCT/US2017/48560 International Search Report", dated Nov. 15, 2017, 13 pages.
(Continued)

*Primary Examiner* — Amir Mehrmanesh
(74) *Attorney, Agent, or Firm* — Qualcomm Inc (DL c/o DeLizio Law, PLLC

(57) ABSTRACT

This disclosure provides systems, methods, and apparatus, including computer programs encoded on computer storage media, for enhancing a device provisioning protocol (DPP) to support multiple configurators. In one aspect, a first configurator device can export a configurator key package. In one aspect, the configurator key package may be used for backup and restore of the configurator keys. The configurator key package may include a configurator private signing key and, optionally, a configurator public verification key. A second configurator device may obtain the configurator key package and also may obtain decryption information which can be used to decrypt the configurator key package. Thus, in another aspect, both the first configurator device and the second configurator device can use the same configurator keys with the device provisioning protocol to configure enrollees to a network.

27 Claims, 10 Drawing Sheets

(56) References Cited

U.S. PATENT DOCUMENTS

| | | | |
|---|---|---|---|
| 2011/0296172 A1 | 12/2011 | Fu et al. | |
| 2014/0258724 A1 | 9/2014 | Lambert et al. | |
| 2015/0229475 A1 | 8/2015 | Benoit et al. | |
| 2015/0319614 A1* | 11/2015 | Cho | H04L 9/3247 726/7 |
| 2016/0323264 A1* | 11/2016 | Nayshtut | H04L 9/3268 |
| 2017/0078408 A1 | 3/2017 | Lepp et al. | |
| 2017/0238164 A1 | 8/2017 | Pang et al. | |
| 2017/0257819 A1 | 9/2017 | McCann et al. | |
| 2017/0295448 A1 | 10/2017 | McCann et al. | |
| 2018/0077255 A1 | 3/2018 | Goto et al. | |
| 2018/0109418 A1 | 4/2018 | Cammarota et al. | |

OTHER PUBLICATIONS

"PCT Application No. PCT/US2017/53247 International Search Report", dated Nov. 16, 2017, 16 pages.

"PKCS 12", Wikipedia, Sep. 18, 2016, pp. 1-2.

"Wi-Fi Alliance Device Provisioning Protocol (DPP)—Draft Released for Public Review and Comments v0.0.23", Wifi Alliance, Jul. 26, 2016, p. 22.

Moriarty, et al., "PKCS #12: Personal Information Exchange Syntax v1.1", Internet Engineering Task Force, IETF, RFC7292.TXT, Jul. 30, 2014, pp. 1-29.

Co-pending U.S. Appl. No. 15/713,176, filed Sep. 22, 2016, 37 pages.

"PCT Application No. PCT/US2017/48560 International Preliminary Report on Patentability", dated May 2, 2019, 7 pages.

"PCT Application No. PCT/US2017/53247 International Preliminary Report on Patentability", dated May 2, 2019, 10 pages.

"U.S. Appl. No. 15/713,176 Office Action", dated Apr. 24, 2019, 27 pages.

* cited by examiner

CONFIGURATOR KEY PACKAGE FOR DEVICE PROVISIONING PROTOCOL (DPP)

CROSS-REFERENCE TO RELATED APPLICATIONS

This application claims the priority to U.S. Provisional Patent Application No. 62/410,309 filed Oct. 19, 2016, entitled "DEVICE PROVISIONING PROTOCOL (DPP) WITH MULTIPLE CONFIGURATORS," and assigned to the assignee hereof. The disclosure of the prior Application is considered part of and is incorporated by reference in this Patent Application.

TECHNICAL FIELD

This disclosure generally relates to the field of communication systems, and, more particularly to a device provisioning protocol (DPP) in a communication network.

DESCRIPTION OF THE RELATED TECHNOLOGY

A network includes devices that communicate with each other via a communication medium. A device is configured with parameters to access the communication medium before the device can communicate with other devices of the network. The process of configuring a device may be referred to as device provisioning and may include operations for association, enrollment, authentication, or other operations. A new device that is not yet configured for a network is referred to as an enrollee device. A device provisioning protocol (DPP) may facilitate configuration of an enrollee device being introduced to the network. A configurator device is a device which has the capability, in accordance with the device provisioning protocol, to configure the enrollee device for the network.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first configurator device of a network. The first configurator device may generate a configurator key package that includes at least a configurator private signing key associated with the first configurator device. The first configurator device may encrypt at least a portion of the configurator key package. The first configurator device may store the configurator key package at a storage location as a backup for subsequent restore by the first configurator device or a second configurator device.

In some implementations, the configurator key package further includes the configurator public verification key.

In some implementations, the first configurator device may encrypt the configurator key package using an encryption key that is different from the configurator private signing key.

In some implementations, the first configurator device may encrypt the configurator private signing key using a private key encryption technique, and including an indication of the private key encryption technique in a header of the configurator key package.

In some implementations, the first configurator device may generate a digital envelope that includes the configurator key package and decryption information. The decryption information may enable the second configurator device to decrypt at least the portion of the configurator key package.

In some implementations, the storage location is at least one member selected from a group consisting of a memory of the first configurator device, a network-shared location, a personal computer, a home server, a cloud-based storage service, and an access point (AP) of a wireless network.

In some implementations, storing the configurator key package includes storing a backup of the configurator key package. The first configurator device may retrieve the backup of the configurator key package from the storage location. The first configurator device may decrypt at least the portion of the configurator key package, and obtain the configurator private signing key from the configurator key package.

In some implementations, the first configurator device may determine the configurator public verification key based, at least in part, on the configurator private signing key obtained from the configurator key package.

In some implementations, the first configurator device may determine a location address of the configurator key package at the storage location, and provide the location address to the second configurator device.

In some implementations, the first configurator device may provide the decryption information using a bootstrapping technique associated with the device provisioning protocol.

In some implementations, the first configurator device may provide decryption information to the second configurator device. The decryption information may enable the second configurator device to decrypt at least the portion of the configurator key package and obtain the configurator private signing key and the configurator public verification key.

In some implementations, the decryption information includes at least one member selected from a group consisting of a location address of the configurator key package at the storage location, a passphrase, and an encryption key that is usable to decrypt at least the portion of the configurator key package.

In some implementations, providing the decryption information includes providing the decryption information using at least one member selected from a group consisting of a display, a speaker, a light signal, a sensor interface, and a short-range radio frequency interface of the first configurator device.

In some implementations, the first configurator device may provide the decryption information by displaying an image having the decryption information encoded therein.

In some implementations, the image is a barcode or a Quick Response (QR) code image.

In some implementations, the configurator private signing key and the configurator public verification key are shared among a plurality of configurators of a first network. Each of the plurality of configurators may be capable of using the configurator private signing key and the configurator public verification key in accordance with a device provisioning protocol to configure an enrollee device for the first network.

Another innovative aspect of the subject matter described in this disclosure can be implemented in a second configurator device. The second configurator device may obtain, from a storage location, a configurator key package. At least a portion of the configurator key package may be encrypted, and the configurator key package may include at least a configurator public verification key and a configurator private signing key associated with a first configurator device. The second configurator device may decrypt at least the portion of the configurator key package. The second configurator device may obtain the configurator private signing key from the configurator key package. The second configurator device may provision an enrollee device for a network utilizing the configurator private signing key in accordance with a device provisioning protocol.

In some implementations, the second configurator device may obtain decryption information from the first configurator device. The decryption information may enable the second configurator device to decrypt at least the portion of the configurator key package.

In some implementations, the second configurator device may obtain the decryption information using at least one member selected from a group consisting of a display, a speaker, a light signal, a sensor interface, and a short-range radio frequency interface of the first configurator device.

In some implementations, the second configurator device may obtain, via a camera associated with the second configurator device, an image having the decryption information encoded therein. The second configurator device may decode the image to retrieve the decryption information.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
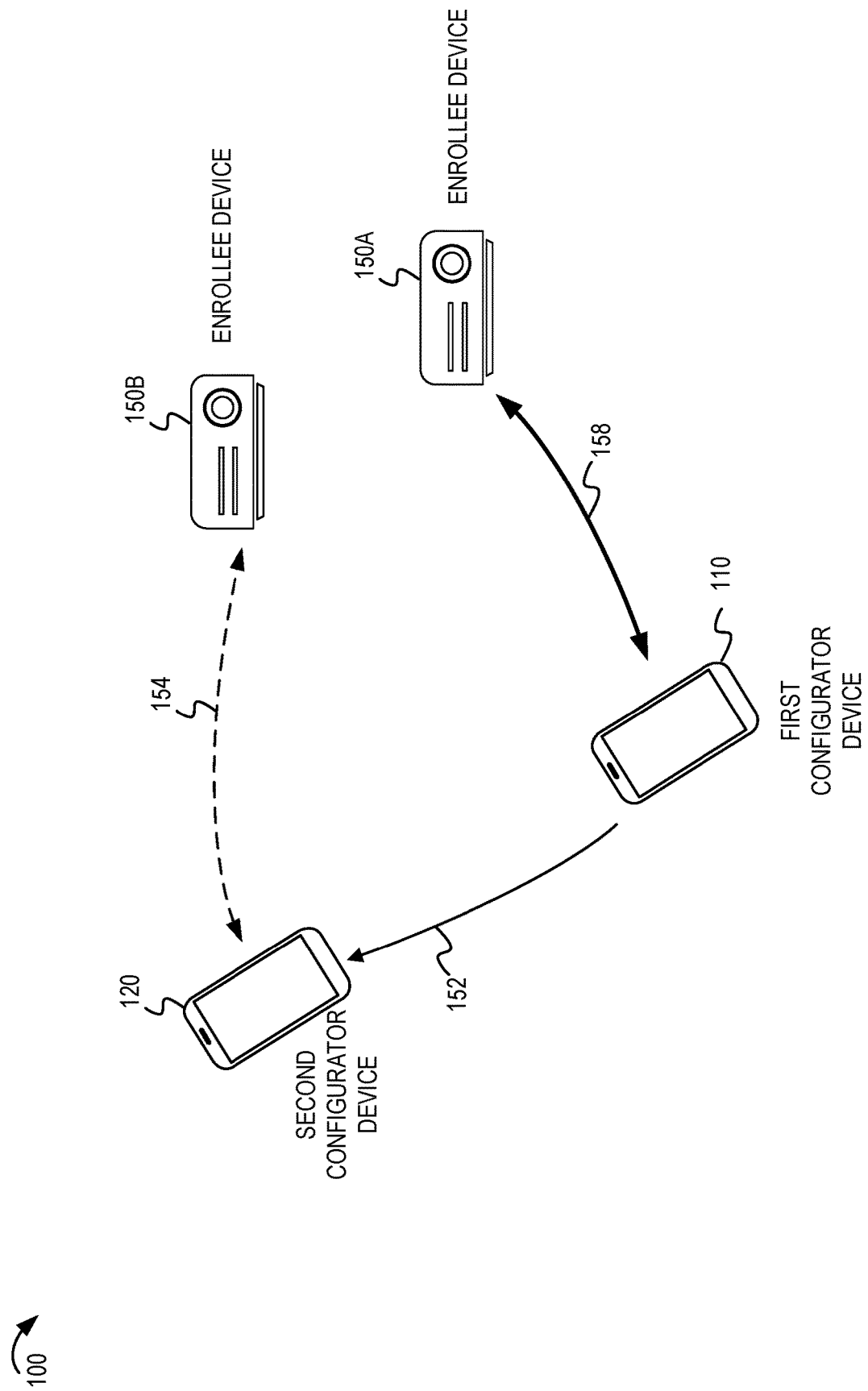
FIG. 1 shows an example system diagram to introduce concepts of a device provisioning protocol with multiple configurators.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

As stated above, a device provisioning protocol (DPP, such as the Wi-Fi Device Provisioning Protocol) may facilitate configuration of an enrollee device being introduced to the network. For example, the DPP may provide authentication and authenticated key establishment between the enrollee device and a configurator device. In some implementations, the DPP uses fewer messages than typically used for an authentication protocol. For example, the DPP authentication protocol may use a "bootstrapped" public key for a first authentication and for generating an ephemeral protocol key before further provisioning. Bootstrapping refers to the use of a trusted out-of-band technique to obtain a public key. The out-of-band technique provides a level of trust based on proximity of the devices. For example, bootstrapping may include the use of a camera on a first device to scan and decode an image that is displayed by (or affixed to) a second device.

In the DPP, configurator devices are responsible for supporting the setup of enrollees. Typically, the bootstrapping key may be used for a first authentication between a configurator device and a new enrollee. After the authentication completes, the configurator device may provision the enrollee for communication via the network. As part of this provisioning, the configurator device enables the enrollee to establish secure associations with other peers in the network. Configurator keys are used by the configurator device to generate a "connector" (which also may be referred to as a "configuration object"). A connector carries the configuration of the enrollee and authorizes connectivity between the enrollee device and a peer device (such as an access point or peer-to-peer neighbor). The configurator keys include signing key pair made up of a configurator private signing key (which may be referred to as "c-sign-key") and a configurator public verification key (which may be referred to as "C-sign-key"). The configurator private signing key (c-sign-key) is used by the configurator to sign connectors, whereas the configurator public verification key (C-sign-key) is used by provisioned devices to verify connectors of other devices are signed by the same configurator. As described further below, the configurator keys correspond mathematically and can be used to verify the authenticity of a message signed by the configurator device. Each connector may be signed using a configurator private signing key of the configurator device. A configurator device may produce one or more connectors for each enrollee that the configurator device configures.

After the connector has been signed using a configurator private signing key of the configurator device, the connector can be verified by any peer in the network. For example, the configurator public verification key can be used to verify the authenticity of the connector that has been signed using the configurator private signing key. Because the configurator keys may be a fundamental aspect of the device provisioning protocol, there may be a situation where the configurator keys may be securely stored as a backup or shared with another configurator device.

In one aspect, a configurator device may prepare a configurator key package as a secure backup of the configurator keys. The configurator key package may be stored as a backup for later restore. For example, the configurator key package may be exported to a location accessible by the configurator device, and potentially other configurator devices. In another aspect, the multiple configurator devices can share the same configurator keys. For example, the configurator keys may be shared with a second configurator device so that the second configurator device can use the configurator keys. As a hypothetical scenario, consider an example when two roommates share a residence, and each roommate operates a configurator device (such as their personal mobile phones) to configure guest enrollee devices. The implementations described in this disclosure enhance the device provisioning protocol so that the configurator keys can be used by multiple configurator devices.

A first configurator device can generate a configurator key package that includes at least a configurator private signing key associated with the first configurator device. The configurator key package also may include a configurator public verification key that is associated with the configurator private signing key. The first configurator device can encrypt at least a portion of the configurator key package, and store the configurator key package at a storage location for subsequent retrieval by the first configurator device or a second configurator device. The configurator key package may be encrypted using an encryption key that can be shared from the first configurator device to the second configurator device. In some implementations, the device provisioning protocol uses bootstrapping for obtaining a public bootstrap key of an enrollee device. Similar bootstrapping techniques may be used to share the encryption key between configurator devices. Bootstrapping provides trust in the encryption key because the out-of-band technique typically involves proximity or physical association with the peer device.

Particular implementations of the subject matter described in this disclosure can be implemented to realize one or more of the following potential advantages. Using implementations in this disclosure, a device provisioning protocol may support backup/restore or export/import of configurator keys. In some implementations, the device provisioning protocol may benefit from having multiple configurator devices for a network. The multiple configurator devices can use the same shared configurator keys, which may improve compatibility between peers configured for the network. For example, the connectors may be signed and verified using the same configurator keys, regardless of which configurator device configured the enrollee device for the network. The techniques for sharing configurator keys in this disclosure may provide a scalable and less complex approach for adding more configurator devices to the device provisioning protocol, as compared to approaches that rely on different configurator keys for each configurator device. By defining a secure storage format for storing or sharing configurator keys, the device provisioning protocol may benefit from increased interoperability between configurator devices.

FIG. 1 shows an example system diagram to introduce concepts of a device provisioning protocol with multiple configurators. The example system 100 includes a first configurator device 110, a second configurator device 120, and enrollee devices 150A and 150B. An enrollee device may be any type of device which has not yet been configured for use in a network managed by either of the first configurator device 110 or the second configurator device 120. The first configurator device 110 may have a pair of configurator keys that include a configurator private signing key and a configurator public verification key. The configurator private signing key may be used to create a digitally signed message. The configurator public verification key may be used to verify the digitally signed message was signed using the configurator private signing key.

As shown in FIG. 1, the first configurator device 110 may implement a device provisioning protocol (shown as arrow 158) to configure an enrollee device 150A for use in a network. To use the device provisioning protocol with multiple configurator devices, the first configurator device 110 may share (shown as arrow 152) its pair of configurator keys with the second configurator device 120. As discussed further below, the configurator keys may not be transmitted directly to the second configurator device 120. Rather, the first configurator device 110 may generate a configurator key package. Some or all the contents of the configurator key package may be encrypted using an encryption key. The configurator key package may be exported to a location in the network accessible by the second configurator device 120. In some implementations, the first configurator device 110 may provide the decryption information to the second configurator device 120 so that the second configurator device 120 can obtain and decrypt the configurator key package. For example, the decryption information may include a location address where the configurator key package is stored. In some implementations, the decryption information may include the encryption key. The decryption information may be provided using a similar bootstrapping technique which is used by the configurator device to obtain a public bootstrap key of an enrollee device. Bootstrapping techniques are described in more detail in the description of FIG. 2. In some other implementations, the decryption information may include a passphrase or other information which can be manually entered into the second configurator device 120 to decrypt the configurator key package.

Once the second configurator device 120 has obtained the decryption information and the configurator key package, the second configurator device 120 can decrypt the configurator key package (such as, using the encryption key) and retrieve the configurator keys. The second configurator device 120 can store the configurator keys and use the shared configurator keys when configuring other enrollee devices. For example, the second configurator device 120 may implement the device provisioning protocol (shown as arrow 154) to configure enrollee device 150B. Even though enrollee devices 150A and 150B were configured by different configurator devices, each of the enrollee devices 150A and 150B can verify the signed connectors (which authorize them to communicate via the network) using a same configurator public verification key.

Figure 2:
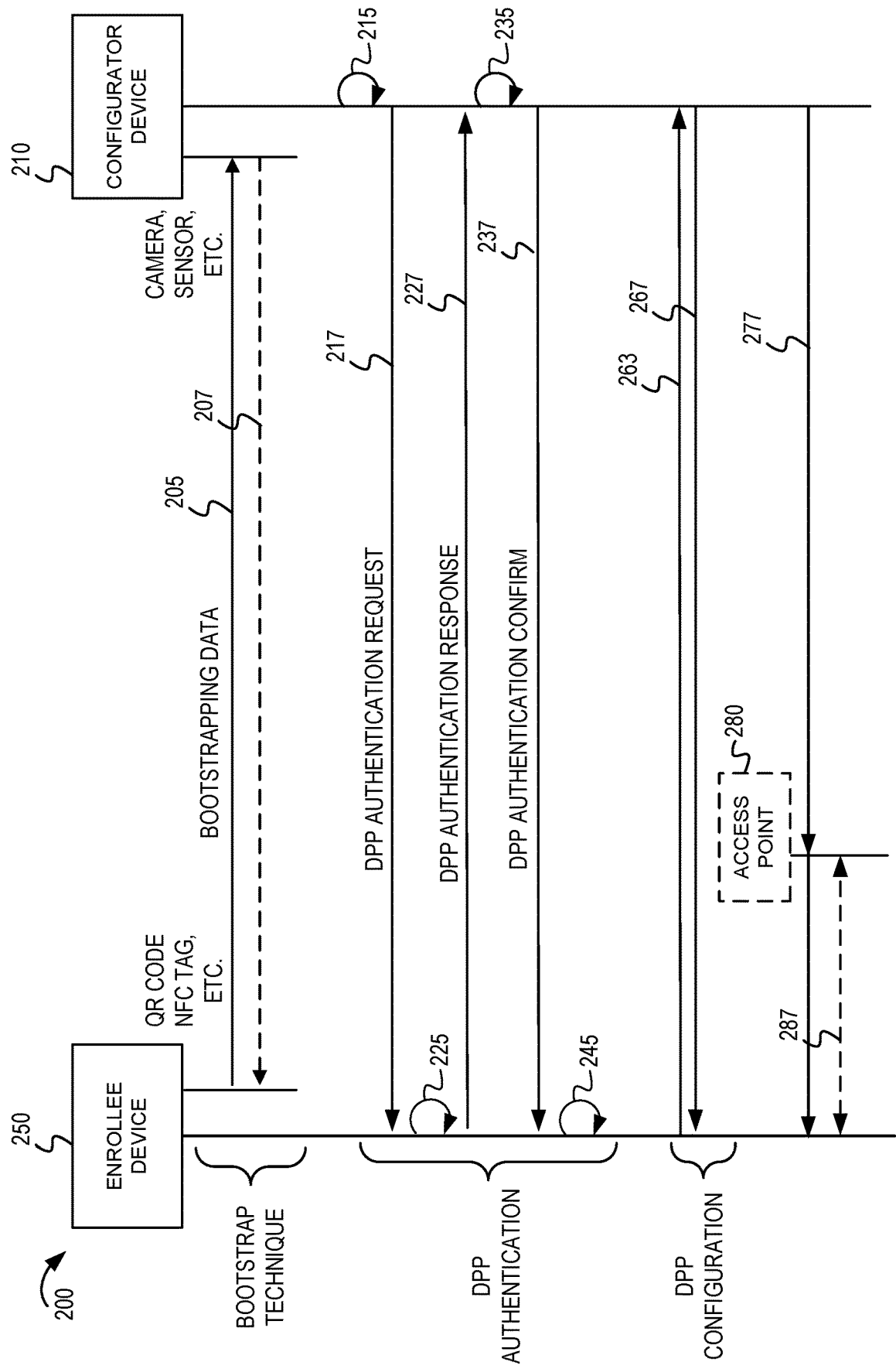
FIG. 2 shows an example message flow diagram of a device provisioning protocol.

FIG. 2 shows an example message flow diagram of a device provisioning protocol. The DPP 200 in FIG. 2 is between one pair of devices, the enrollee device 250 and a configurator device 210. The DPP 200 includes three operations: the bootstrap technique, the DPP authentication, and the DPP configuration. The DPP authentication relies on the authenticating party's bootstrapping key having been obtained through a bootstrapping technique (such as those described further below).

Bootstrapping refers to an out-of-band technique for obtaining a shared key from another device. Each of the enrollee device 250 and the configurator device 210 may have a public bootstrap key (also sometimes referred to as a "public identity key") which is trusted for an initial authentication and for generating a temporary provisioning key. Bootstrapping is one of a variety of techniques which can be used to share the public bootstrap key. For example, bootstrapping may include scanning a Quick Response® (QR) code that encodes the public bootstrap key. Support for this form of authentication allows certain devices (such as IOT devices, wearable accessories, home automation devices, etc.) that lack a user interface to be authenticated with a configurator device.

At 205, the configurator device 210 may obtain enrollee bootstrapping data from the enrollee device 250. For example, the enrollee device 250 may have a visual tag printed on it (or on the packaging, or inserted in the packaging). The visual tag may be a barcode, matrix code, two-dimensional code, or the like. A common example of a barcode may be a QR code. The configurator device 210 may detect the barcode (or similar visual tag) using a camera and corresponding software. The configurator device 210 may obtain the enrollee bootstrapping data by decoding the barcode. In one implementation, the enrollee bootstrapping data may include a public bootstrap key for the enrollee device 250. In addition to the public bootstrap key, other information also may be included in the enrollee bootstrapping data. For example, the enrollee bootstrapping data may include the public bootstrap key as well as a Global Operating Class and a Channel Number list. The Global Operating Class and Channel number list may be used to determine which radio parameters or which wireless channel(s) the enrollee device 250 will use for DPP authentication. For example, together the Global Operating Class and Channel number list may indicate which wireless channel the enrollee device 250 will listen for (or send) a DPP authentication request message. At 207, in some implementations, the enrollee device 250 also may obtain a configurator bootstrapping data from the configurator device 210. When both parties obtain each other's bootstrapping data, the DPP authentication can utilize mutual bi-directional authentication.

In addition to the bootstrapping technique shown in FIG. 2, a variety of other bootstrapping techniques may be used. The bootstrapping technique allows a recipient to trust that the bootstrapping data belongs to a particular device. As described in FIG. 1, scanning a two-dimensional matrix barcode (such as a QR code) is one technique for obtaining bootstrapping data. As an alternative to scanning a barcode, the configurator device 210 may use Neighbor-Aware Networking (NAN) (not shown). NAN provides the discovery capability and service information exchange over wireless medium without having an association between devices. Another bootstrapping technique is to transfer bootstrapping data over other media that can provide a certain amount of trust to the integrity of the transferred content. For example, in some implementations, bootstrapping may include the use of Universal Serial Bus (USB), near-field communication (NFC), or short-range radio communication (such as Bluetooth™ communication). Yet another bootstrapping technique is to mask the bootstrapping data with a shared code/key/phrase/word (hereinafter, "code") and rely on knowledge of the shared code to unmask the bootstrapping key. If a peer is able to prove it knows and can use the shared code, the peer's bootstrapping data can be trusted.

The DPP authentication phase uses the bootstrapping data, obtained using a bootstrapping technique, to strongly authenticate the configurator and enrollee. The DPP authentication consists of a 3-message exchange and generates a shared secret and authenticated key. At 215, the configurator device 210 generates a first nonce, generates a protocol key pair, performs a hash function of the enrollee public bootstrap key, and generates a first symmetric key based on a shared secret derived from the hashed bootstrap data. The configurator device 210 sends a DPP Authentication Request message 217 via one or more of the channels in the Channel List. The DPP authentication request message 217 includes the shared secret and the first nonce encrypted by the first symmetric key.

The enrollee device 250 receives the DPP Authentication Request message 217. At 225, the enrollee device 250 checks whether a hash of its public bootstrap key is in the message. If a hash of its public bootstrap key is in the message, the enrollee device 250 generates the shared secret and derives the first symmetric key. The enrollee device 250 attempts to unwrap the first nonce using the first symmetric key. Next, the enrollee device 250 generates a second nonce, a shared secret, and a second symmetric key. The enrollee device 250 wraps the two nonces and its capabilities in the first symmetric key and wraps the authenticating tag in the second symmetric key. The enrollee device 250 then places a hash of its public bootstrapping key (and optionally includes a hash of the configurators public bootstrapping key if it is doing mutual authentication), its public protocol key, the wrapped nonces along with its wrapped network public key and the wrapped authentication tag in a DPP Authentication Response message 227. The DPP Authentication Response message 227 is transmitted to the configurator device 210.

After successfully receiving a response, the configurator device 210 validates the result at 235 and transmits a DPP Authentication Confirm message 237 to complete the DPP authentication phase. After successful completion of these frame exchanges, a secure channel between the Initiator/Configurator and Responder/Enrollee is established at 245.

After the DPP authentication is completed, the configurator device 210 provisions the enrollee device 250 for device-to-device communication or infrastructure communication. As part of this provisioning, the configurator device 210 enables the enrollee device 250 to establish secure associations with other peers in the network. The enrollee device 250 initiates the configuration phase by transmitting a DPP Configuration Request message 263, and is provisioned with configuration information in a DPP Configuration Response message 267. After successfully receiving the DPP Configuration Response message 267, the enrollee device 250 is provisioned with the configuration information usable to establish secure access to the network.

In some implementations, the configurator device 210 also may be an access point of a wireless local area network (WLAN). Alternatively, the configurator device 210 may be separate from the access point. For example, the configuration information provided by the configurator device 210 may be used by the enrollee device 250 to establish a secure wireless connection with an access point 280. In another implementation, the configurator device 210 may be a peer-to-peer (P2P) group owner or P2P group member.

At the conclusion of the DPP configuration phase, the configurator device 210 may create a connector (represented by arrow 277). The connector is a signed introduction that enables the enrollee device 250 to get a trusted statement that other devices on the network are permitted to communicate with it. Each connector may include a tuple of a group identifier, a network role, and a network access provisioning key, all signed using a configurator private signing key of the configurator device. The identifier can indicate a specific peer or the wildcard, indicating all peers. As described above, the connector is signed by the configurator private signing key (c-sign-key) of the configurator device 210 and can be verified using the configurator public verification key (C-sign-key) of the configurator device 210

If the configurator device 210 is separate from the access point 280, the enrollee device 250 can use the configuration information and the connector as credentials for a wireless association 287 with the access point 280. The enrollee device 250 may discover the access point 280, transmit a Peer Discovery Request frame (not shown), and then wait for a Peer Discovery Response frame (not shown). Upon successful validation of the Peer Discovery frames, the enrollee device 250 and access point 280 mutually derive a pairwise master key (PMK) and follow the normal IEEE 802.11 procedures. For example, a 4-way handshake procedure may be performed between the enrollee device 250 and the access point 280 to complete authentication and wireless association of the enrollee device 250 with the access point 280. A pairwise master key (PMK) may be used for subsequent Wi-Fi™ Protected Access (WPA) handshake and configuration messages. Alternatively, if the access point 280 is a legacy access point, the configuration information may include a pre-shared key (PSK) or a PSK Passphrase credential to allow the enrollee device 250 to connect to the access point 280. In this implementation, the enrollee device 250 will use the configuration information to discover and associate with an AP using IEEE 802.11 and WPA2-Personal network access procedures.

Figure 3:
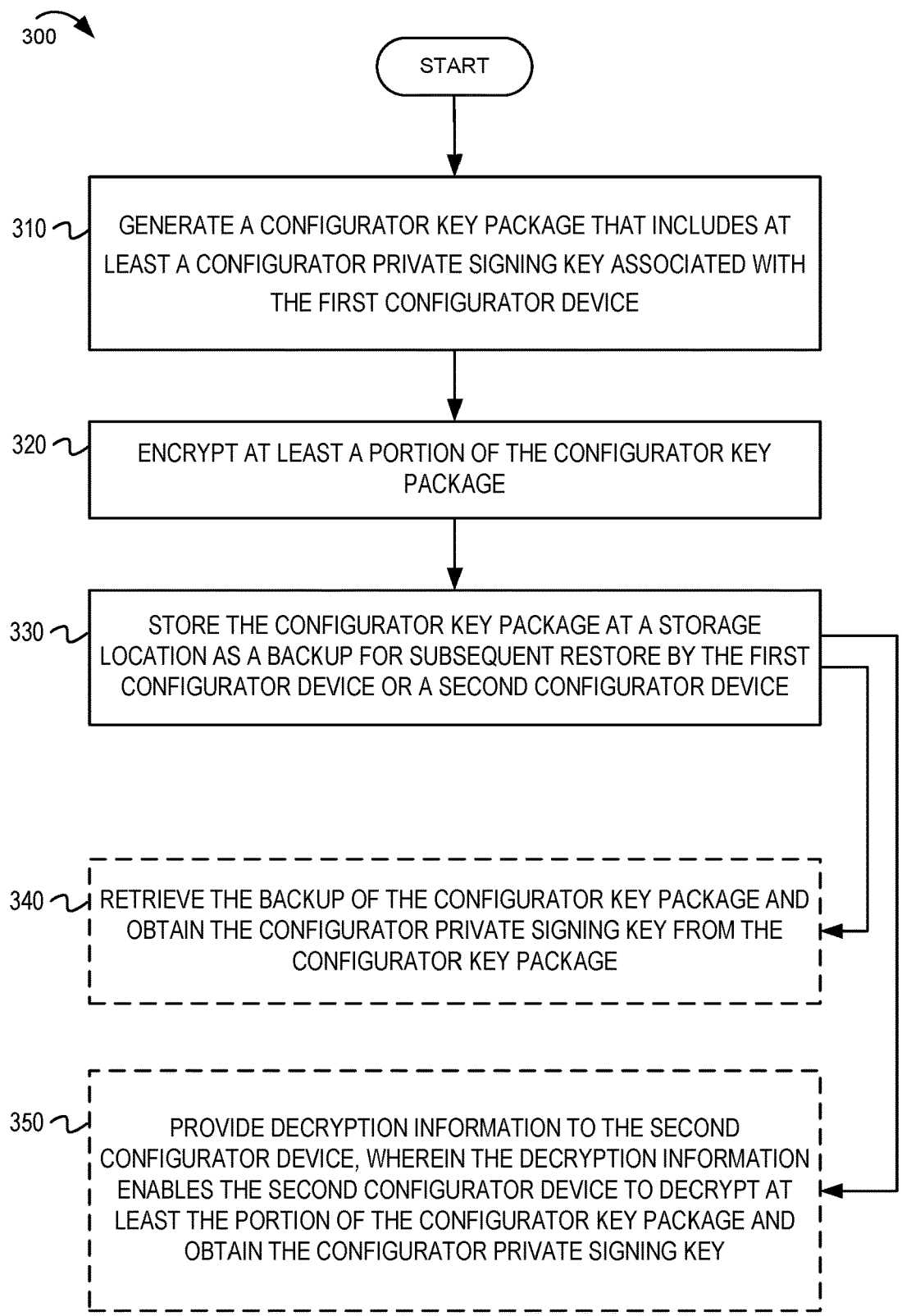
FIG. 3 shows an example flowchart for a first configurator device storing configurator keys.

FIG. 3 shows an example flowchart for a first configurator device storing configurator keys. The flowchart 300 begins at block 310. At block 310, the first configurator device may generate a configurator key package that includes at least a configurator private signing key associated with the first configurator device. In some implementations, the configurator key package may include both the configurator private signing key and the configurator public verification key.

At block 320, the first configurator device may encrypt at least a portion of the configurator key package. For example, the configurator key package may be encrypted using an encryption key that is different from the configurator private signing key. In some implementations, the first configurator device may encrypt the configurator private signing key (and, optionally, the configurator public verification key) using a private key encryption technique. In some implementations, the configurator key package may include a header that describes a structure, contents, or an encryption technique used to prepare the configurator key package.

At block 330, the first configurator device may store the configurator key package at a storage location as a backup for subsequent restore by the first configurator device or a second configurator device. For example, the storage location may be a memory of the first configurator device, a network-shared location, a personal computer, a home server, a cloud-based storage service, or an access point (AP) of a wireless network.

After the configurator key package has been stored, there may be different ways to use the stored configurator key package. For example, at block 340, the first configurator device may retrieve the backup of the configurator key package from the storage location. The first configurator device may decrypt the configurator key package and obtain the configurator private signing key from the configurator key package. In another example, at block 350, the first configurator device may provide decryption information to a second configurator device. The decryption information may enable the second configurator device to decrypt at least the portion of the configurator key package that was encrypted by the first configurator device. The second configurator device can obtain the configurator private signing key from the configurator key package. If the configurator key package includes the configurator public verification key, the second configurator device can restore the configurator public verification key from the configurator key package. If the configurator key package does not include the configurator public verification key, the second configurator device may determine the configurator public verification key based, at least in part, on the configurator private signing key.

Figure 4:
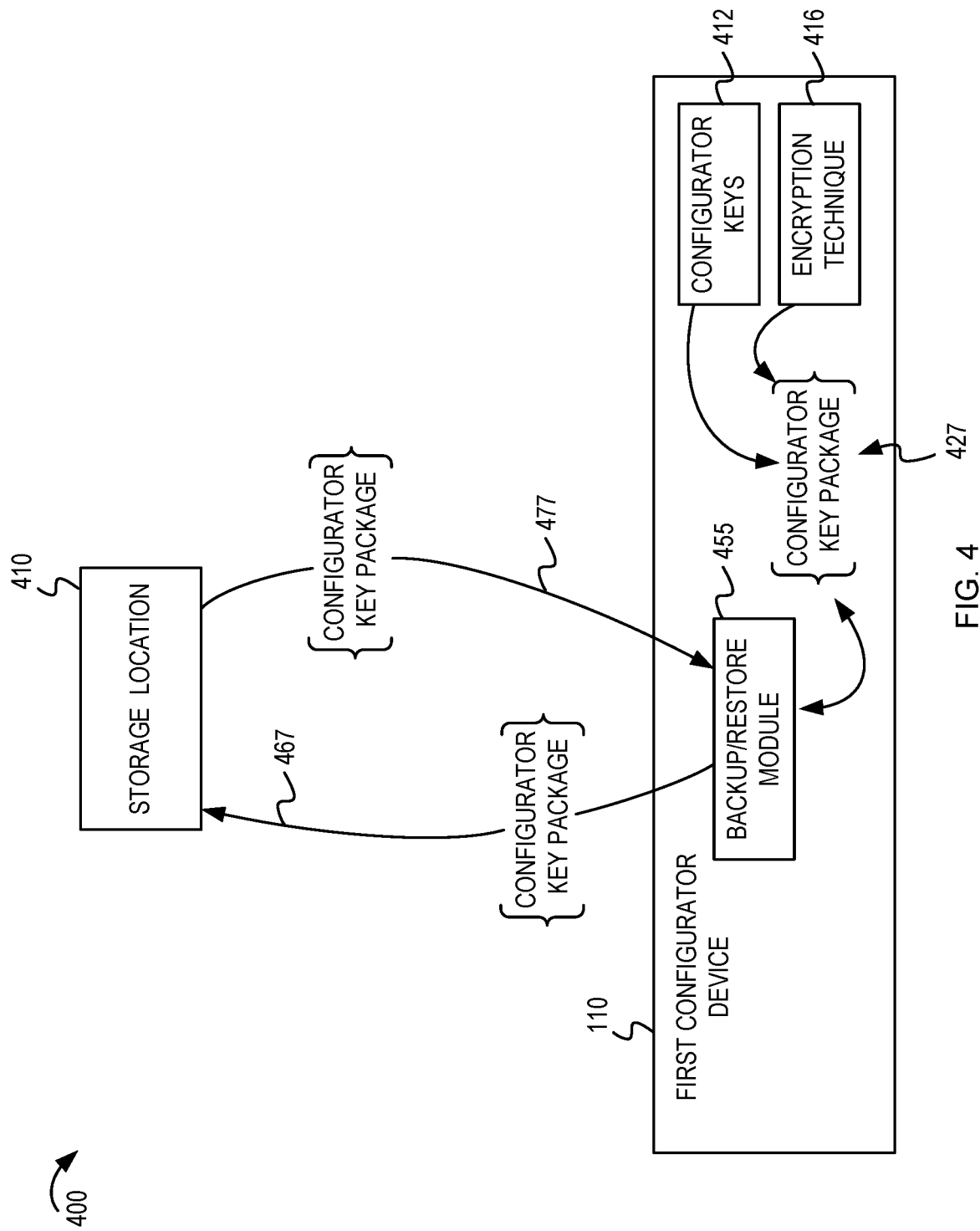
FIG. 4 shows an example system diagram to describe a backup and restore of the configurator keys by a first configurator device.

FIG. 4 shows an example system diagram to describe a backup and restore of the configurator keys by a first configurator device. The example system 400 includes a first configurator device 110 and a storage location 410. The first configurator device 110 has configurator keys 412 and is capable of encrypting at least part of the configurator keys 412 using an encryption technique 416. There may be a variety of encryption techniques that can be readily applied to implementations of this disclosure. Examples of different encryption techniques are described further below.

The first configurator device 110 can generate a configurator key package 427 that includes the configurator keys 412 and has been at least partially encrypted (denoted by curly brackets) using the encryption technique 416. The first configurator device 110 also has a backup/restore module 455. The backup/restore module 455 can cause the configurator key package 427 to be stored (shown at arrow 467) at the storage location 410. For example, the act of storing the configurator key package 427 may be referred to as a backup.

After the configurator key package 427 has been stored, the backup/restore module 455 may be capable of restoring the configurator keys. The backup/restore module 455 may retrieve (shown at arrow 477) the configurator key package 427 from the storage location 410. For example, the backup/restore module 455 may access or download the configurator key package 427 from the storage location 410. The backup/restore module 455 may restore the configurator keys by reversing the encryption technique and obtaining the configurator keys from the configurator key package 427.

Figure 5:
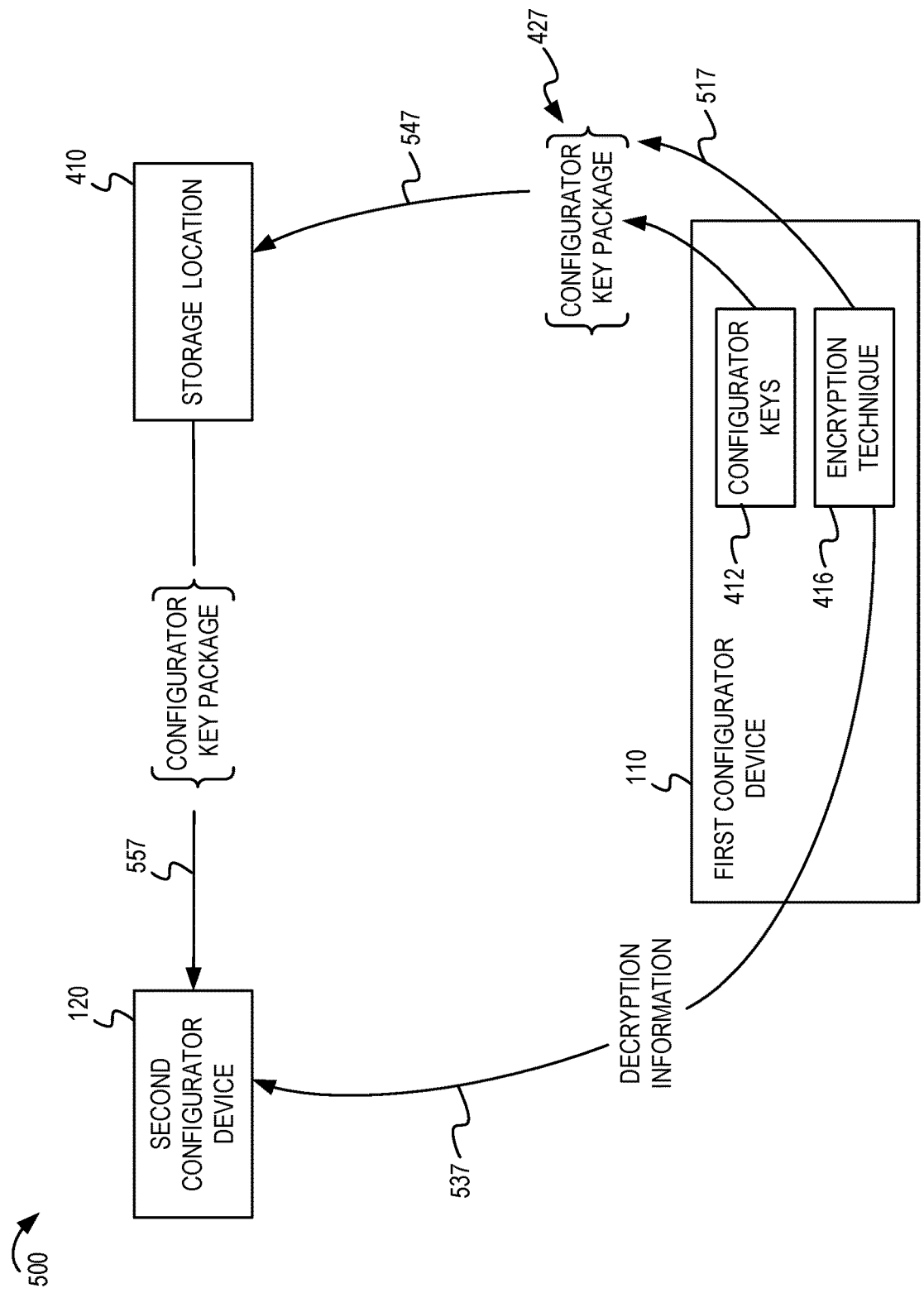
FIG. 5 shows an example system diagram to describe sharing configurator keys from a first configurator device to a second configurator device.

FIG. 5 shows an example system diagram to describe sharing configurator keys from a first configurator device to a second configurator device. The example system 500 includes a first configurator device 110, a second configurator device 120, and a storage location 410. The storage location 410 may be a network-shared memory, a network drive, a resource of an access point, a cloud-based storage location, or any other resource that is accessible by the second configurator device 120 via a communication network. As described above, the first configurator device 110 has configurator keys 412, which may include a configurator private signing key and a configurator public verification key. To provide the configurator keys to the second configurator device 120, the first configurator device 110 may export the configurator keys in the configurator key package 427. Represented at 517, the first configurator device 110 may encrypt (using an encryption key) the configurator keys and create the configurator key package 427.

In some implementations, the first configurator device 110 may generate the configurator key package in accordance with a family of standards called Public-Key Cryptography Standards (PKCS). For example, PKCS #8 is one of the standards and defines a standard syntax for storing private key information. The encryption in PCKS #8 specifies a Digital Envelope, which is composed of an Asymmetric Key Package (with information about the configuration) and an encryption key. The encryption key can be protected using either Key management, Key agreement, Symmetric Key derived with a shared password, or Symmetric Key Encryption through shared information. Thus, only a device which can derive the encryption key can decrypt the configurator key package. In one implementation, the first configurator device 110 may create a public connector profile in the network so that any configurator device can obtain the configurator key package 427 from the storage location 410 (in the form of a PKCS #8 blob).

The public connector profile may include, for example, a location address such as a uniform resource locator (URL) or a Uniform Resource Identifier (URI) for the storage location 410 where the configurator key package can be downloaded. Although the configurator key package may be accessible by multiple devices, only an authorized configurator device (such as second configurator device 120) will have the decryption information needed to decrypt the configurator key package. For example, the decryption information may be a shared password to derive the encryption key from the Digital Envelope associated with the configurator key package. Alternatively, the decryption information may be any other means for a device to obtain the encryption key used to encrypt the configurator key package. In another implementation, the location address may be maintained as a secret which is provided only to authorized configurators. At 547, the configurator key package 427 is stored at the storage location 410 for subsequent retrieval. In some implementations, the first configurator device 110 may send the configurator key package 427 to the second configurator device 120 via a network and cause the configurator key package 427 to be stored at a storage location that is co-located at the second configurator device 120.

The second configurator device 120 may obtain (represented by arrow 537) decryption information from the first configurator device 110. In some implementations, the decryption information may include an encryption key needed to decrypt the configurator key package. In some implementations, the decryption information may include a location address indicating where the configurator key package is stored at the storage location 410. There may be a variety of ways for the first configurator device 110 to provide the decryption information to the second configurator device 120—including bootstrapping. For example, the encryption key may be encoded in a barcode image which can be scanned by the second configurator device 120. In some implementations, the barcode image may be static or ephemeral. For example, the first configurator device 110 may be equipped with a display and may create a barcode image (or other coded image) encoded with the encryption key. The encryption key can be determined by scanning and decoding the machine-readable image (such as the QR code) with a camera, smartphone, scanner, or another machine-readable code reader of the second configurator device 120. In addition to the encryption key, the barcode image also may be encoded with the location address where the second configurator device 120 can download the configurator key package 427.

The second configurator device 120 can download (represented by arrow 557) the configurator key package 427 from the network location. Once the second configurator device 120 has obtained the configurator key package 5427 and the encryption key, the second configurator device 120 can decrypt the encrypted private key package to obtain the configurator keys, and store the configurator keys in a memory of the second configurator device 120 for use with the device provisioning protocol.

Figure 6:
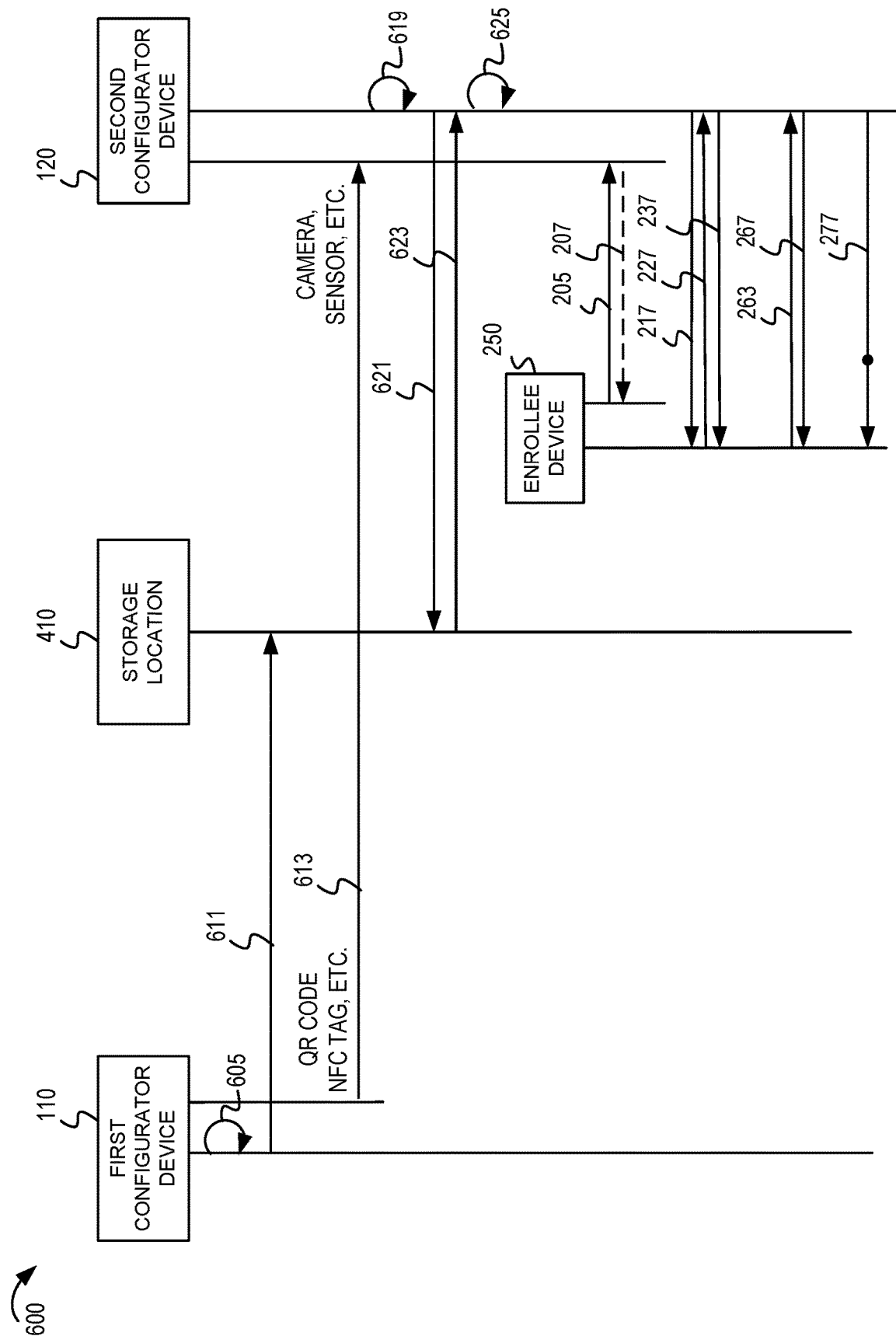
FIG. 6 shows an example message flow diagram of the device provisioning protocol with multiple configurators.

FIG. 6 shows an example message flow diagram of the device provisioning protocol with multiple configurators. The message flow diagram 600 includes messages between a first configurator device 110, a second configurator device 120, and a storage location 410. At 605, the first configurator device 110 may generate a configurator key package that includes the configurator keys (c-sign-key and C-sign-key) of the first configurator device 110. The configurator key package is encrypted using an encryption key. At 611, the first configurator device 110 exports and stores the configurator key package at the storage location 410. The first configurator device 110 also may determine a location address indicating where the configurator key package is stored. The encryption key and location address may be encoded as a barcode image or other type of data structure.

At 613, the second configurator device 120 may obtain the configurator key package (and, optionally, the location address). For example, the second configurator device 120 may obtain and decode the barcode image or other data structure. At 619, the second configurator device 120 may determine the location address of the configurator key package. The second configurator device 120 may determine the location address from the barcode image, via another message (not shown) from the first configurator device 110, using a public connector profile, or by any other mechanism for sharing a location address. Based on the location address, the second configurator device 120 may send a request (at 621) for the configurator key package to the storage location 410. At 623, the second configurator device 120 may receive the configurator key package from the storage location 410. At 625, the second configurator device 120 may decrypt the configurator key package (using the encryption key) and retrieve the configurator keys. Once the second configurator device 120 has the configurator keys, the second configurator device 120 may configure an enrollee device 250 using the same configurator keys that the first configurator device 110 would use.

Device provisioning (including bootstrap, authentication, and configuration) can continue as described previously (see corresponding descriptions of messages 205, 207, 217, 227, 237, 263, 267, and 277 in FIG. 2).

Figure 7:
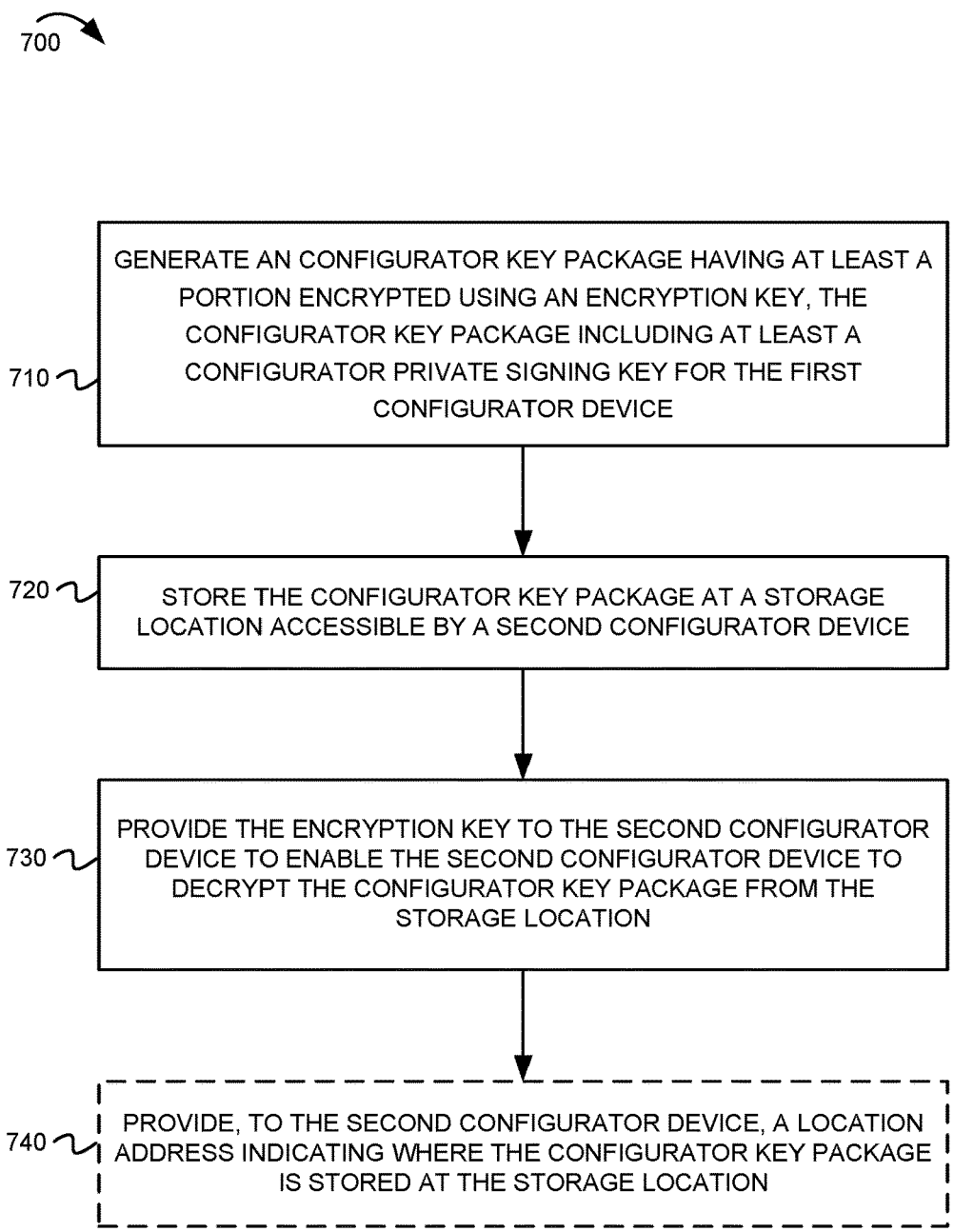
FIG. 7 shows an example flowchart for operating the first configurator device.

FIG. 7 shows an example flowchart for operating the first configurator device. The flowchart 700 begins at block 710. At block 710, the first configurator device may generate a configurator key package having at least a portion encrypted using an encryption key. The configurator key package may include at least a configurator private signing key for the first configurator device. At block 720, the first configurator device may store the configurator key package at a storage location accessible by a second configurator device. At block 730, the first configurator device may provide the encryption key to the second configurator device to enable the second configurator device to decrypt the configurator key package from the storage location. At block 740, the first configurator device may optionally provide a location address to the second configurator device. The location address may indicate where the configurator key package is stored at the storage location.

Figure 8:
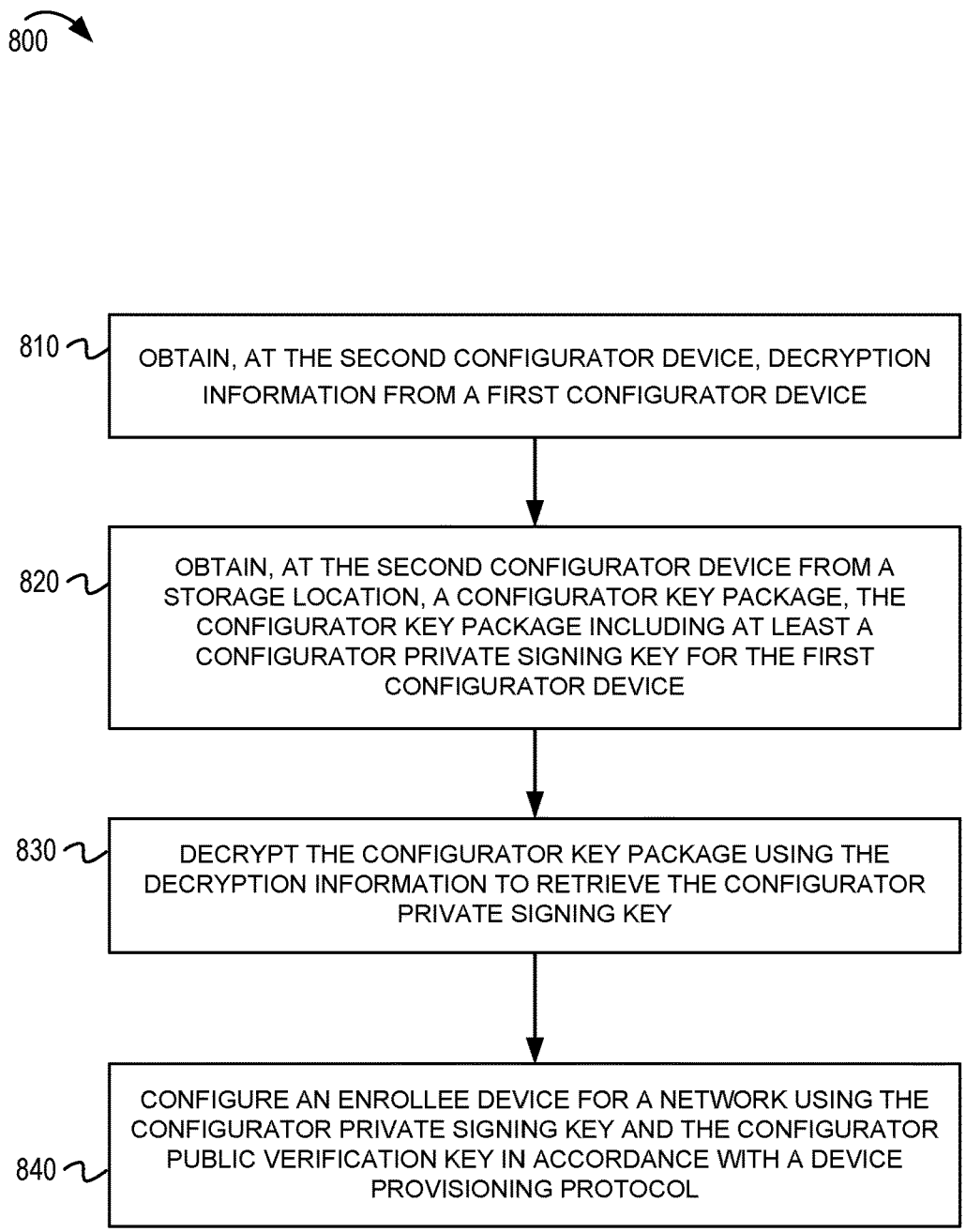
FIG. 8 shows an example flowchart for operating the second configurator device.

FIG. 8 shows an example flowchart for operating the second configurator device. The flowchart 800 begins at block 810. At block 810, the second configurator device may obtain, at the second configurator device, decryption information from a first configurator device. For example, the decryption information may be an encryption key that was previously used to encrypt configurator key package. At block 820, the second configurator device may obtain, at the second configurator device from a storage location, a configurator key package. The configurator key package may include at least a configurator private signing key for the first configurator device. At block 830, the second configurator device may decrypt the configurator key package using the decryption information to retrieve the configurator private signing key. If the configurator key package includes the configurator public verification key, the second configurator device can restore the configurator public verification key from the configurator key package. If the configurator key package does not include the configurator public verification key, the second configurator device may determine the configurator public verification key based, at least in part, on the configurator private signing key. At block 840, the second configurator device may configure an enrollee device for a network using the configurator private signing key and the configurator public verification key in accordance with a device provisioning protocol.

Figure 9:
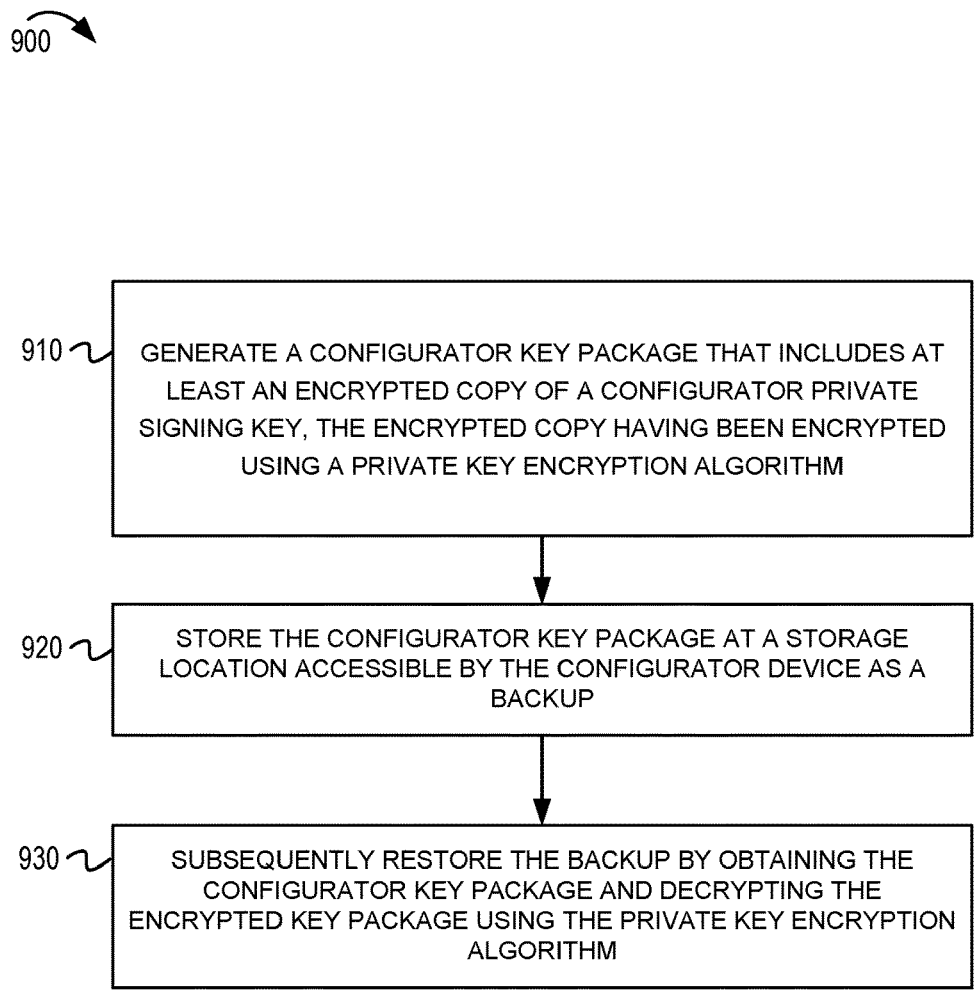
FIG. 9 shows an example flowchart for operating a configurator device to backup and restore configurator keys.

FIG. 9 shows an example flowchart for operating a configurator device to backup and restore configurator keys. The flowchart 900 begins at block 910. At block 910, the configurator device may generate a configurator key package that includes at least an encrypted copy of a configurator private signing key. The encrypted copy may be encrypted using a private key encryption technique. For example, the private key encryption technique may be defined in at least one of Internet Engineering Task Force (IETF) Request for Comments (RFC) 5958 and RFC 5208. In some implementations, the private key encryption technique may be identified in a header of the configurator key package.

At block 920, the configurator device may store the configurator key package at a storage location accessible by the configurator device as a backup. The storage location may be any storage device which is available to the configurator device. Examples of the storage location include a local memory of the configurator device, a storage location, a personal computer, a home server, a cloud-based storage service, and the like. In some implementations, the storage location may be used to store backups from different configurator devices using different configurator keys.

At block 930, the configurator device may subsequently restore the backup by obtaining the configurator key package and decrypting the configurator key package using the private key encryption technique.

Below is an example of a configurator key package which may be used with any of the implementations described herein. The example configurator key package is an asymmetric key package is an ASN.1 sequence of One Asymmetric Key defined in RFC5958 (using PKCS #8):

```
AsymmetricKeyPackage ::= SEQUENCE SIZE (1) OF
OneAsymmetricKey
OneAsymmetricKey ::= SEQUENCE {
    version              Version,
    privateKeyAlgorithm  PrivateKeyAlgorithmIdentifier,
```

-continued

```
    privateKey           PrivateKey,
    [[publicKey          PublicKey OPTIONAL,]]
    [Optional Information as needed]
    }
PrivateKey ::= SEQUENCE {
    encryptionAlgorithm  EncryptionAlgorithmIdentifier,
    encryptedData        EncryptedData }
EncryptionAlgorithmIdentifier ::= AlgorithmIdentifier
    { CONTENT-ENCRYPTION,
    { KeyEncryptionAlgorithms } }
EncryptedData ::= OCTET STRING containing the encrypted version of
the configurator private signing key
```

Figure 10:
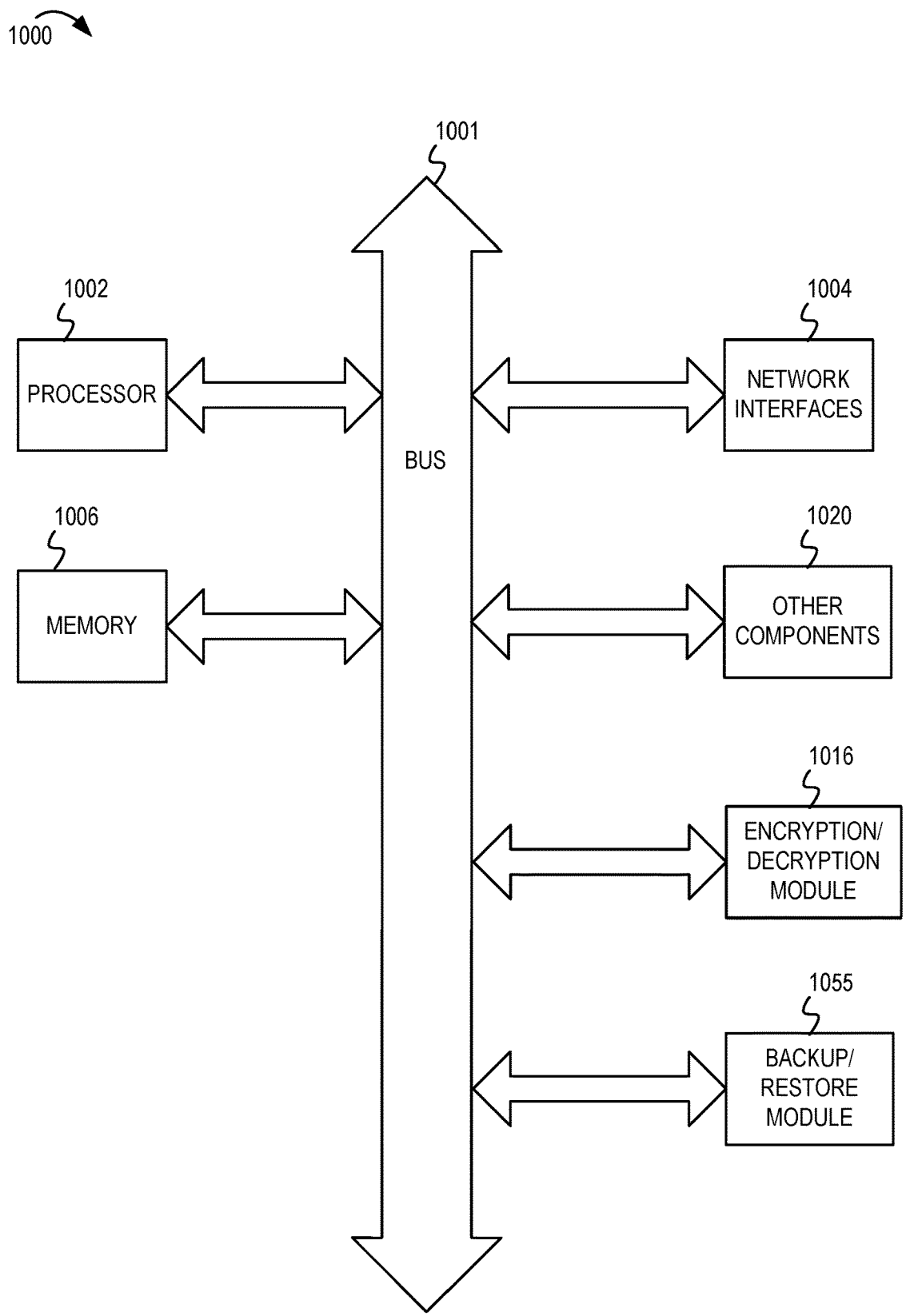
FIG. 10 shows a block diagram of an example electronic device for implementing aspects of this disclosure.

FIG. 10 shows a block diagram of an example electronic device 1000 for implementing aspects of this disclosure. In some implementations, the electronic device 1000 may be similar to the first configurator device 110 or the second configurator device 120. The electronic device 1000 may be a laptop computer, a tablet computer, a mobile phone, a gaming console, a smartwatch, virtual or augmented reality device, a drone, or another electronic system. The electronic device 1000 includes a processor 1002 (possibly including multiple processors, multiple cores, multiple nodes, or implementing multi-threading, etc.). The electronic device 1000 includes a memory 1006. The memory 1006 may be system memory or any one or more of the below-described possible realizations of a machine-readable medium or computer-readable medium. The electronic device 1000 also may include a bus 1001 (such as PCI, ISA, PCI-Express, HyperTransport®, InfiniBand®, NuBus, AHB, AXI, etc.). The electronic device may include one or more network interfaces 1004, which may be a wireless network interface (such as a WLAN interface, a Bluetooth® interface, a WiMAX interface, a ZigBee® interface, a Wireless USB interface, etc.) or a wired network interface (such as a powerline communication interface, an Ethernet interface, etc.). In some implementations, electronic device 1000 may support multiple network interfaces 1004, each of which may be configured to couple the electronic device 1000 to a different communication network.

The memory 1006 includes functionality to support various implementations described above. The memory 1006 may include one or more functionalities that facilitate implementation of a device provisioning protocol. For example, memory 1006 can implement one or more aspects of first configurator device 110 or second configurator device 120 as described above. The memory 1006 can embody functionality to enable implementations described in FIGS. 1-9 above. In some implementations, memory 1006 can include one or more functionalities that facilitate generating, storing, or retrieving configurator key package. The electronic device 1000 may include an encryption/decryption module 1016 or a backup/restore module 1055. For example, the encryption/decryption module 1016 may facilitate the encryption of at least part of the configurator key package or the decryption of the configurator key package. The backup/restore module 1055 may facilitate the storage of the configurator key package and retrieval of the configurator key package from a storage location. The electronic device 1000 also may include other components 1020, such as a sensor unit, user interface components, or another input/output component. In some other implementations, electronic device 1000 may have other appropriate sensors (such as a camera, microphone, NFC detector, bar code scanner, etc.) used to obtain decryption information using a bootstrapping technique.

Any one of these functionalities may be partially (or entirely) implemented in hardware, such as on the processor 1002. For example, the functionality may be implemented with an application specific integrated circuit, in logic implemented in the processor 1002, in a co-processor on a peripheral device or card, etc. Further, realizations may include fewer or additional components not illustrated in FIG. 10 (such as video cards, audio cards, additional network interfaces, peripheral devices, etc.). The processor 1002 and the memory 1006 may be coupled to the bus 1001. Although illustrated as being coupled to the bus 1001, the memory 1006 may be directly coupled to the processor 1002.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends on the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include cache memory, RAM (including SRAM, DRAM, zero capacitor RAM, Twin Transistor RAM, eDRAM, EDO RAM, DDR RAM, EEPROM, NRAM, RRAM, SONOS, PRAM, or the like), ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-Ray™ disc where disks usually reproduce data magnetically, while discs reproduce data optically with lasers. Combinations of the above also can be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by a first configurator device of a network, comprising:
   implementing, by the first configurator device, a device provisioning protocol in which the first configurator device is configured to use a configurator private signing key to enroll an enrollee device with the network;
   generating a configurator key package that includes at least the configurator private signing key associated with the first configurator device;
   encrypting at least a portion of the configurator key package; and
   storing the configurator key package at a storage location as a backup for subsequent restore by a second configurator device, wherein the same configurator private signing key and the same configurator public verification key are shared among a plurality of configurators including the second configurator device to enroll different enrollee devices with the network in accordance with the device provisioning protocol.

2. The method of claim 1, wherein the configurator key package further includes a configurator public verification key associated with the configurator private signing key.

3. The method of claim 1, wherein encrypting at least the portion of the configurator key package includes encrypting the configurator key package using an encryption key that is different from the configurator private signing key.

4. The method of claim 1, wherein encrypting at least the portion of the configurator key package includes encrypting the configurator private signing key using a private key encryption technique, and including an indication of the private key encryption technique in a header of the configurator key package.

5. The method of claim 1, wherein storing the configurator key package includes:
   generating a digital envelope that includes the configurator key package and decryption information, wherein the decryption information enables the second configurator device to decrypt at least the portion of the configurator key package.

6. The method of claim 1, wherein the storage location is at least one member selected from a group consisting of a memory of the first configurator device, a network-shared location, a personal computer, a home server, a cloud-based storage service, and an access point (AP) of a wireless network.

7. The method of claim 1, further comprising:
   retrieving, by the first configurator device, the backup of the configurator key package from the storage location;
   decrypting at least the portion of the configurator key package; and
   obtaining the configurator private signing key from the configurator key package.

8. The method of claim 7, further comprising:
   determining a configurator public verification key based, at least in part, on the configurator private signing key obtained from the configurator key package.

9. The method of claim 1, further comprising:
   determining a location address of the configurator key package at the storage location; and
   providing the location address to the second configurator device.

10. The method of claim 1, further comprising:
    providing decryption information to the second configurator device, wherein the decryption information enables the second configurator device to decrypt at least the portion of the configurator key package and obtain the configurator private signing key.

11. The method of claim 10, wherein the decryption information includes at least one member selected from a group consisting of a location address of the configurator key package at the storage location and an encryption key that is usable to decrypt at least the portion of the configurator key package.

12. The method of claim 10, wherein providing the decryption information includes communicating the decryption information in a signal from at least one member selected from a group consisting of a display, a speaker, a light signal, a sensor interface, and a short-range radio frequency interface of the first configurator device.

13. The method of claim 10, wherein providing the decryption information includes displaying an image having the decryption information encoded therein.

14. The method of claim 13, wherein the image is a barcode or a Quick Response (QR) code image.

15. An apparatus for use in a first configurator device, comprising:
    at least one processor configured to:
      implement a device provisioning protocol in which the first configurator device is configured to use a configurator private signing key to enroll an enrollee device with the network,
      generate a configurator key package that includes at least the configurator private signing key associated with the first configurator device, and
      encrypt at least a portion of the configurator key package; and
    a first interface configured to output the configurator key package to a storage location as a backup for subsequent restore by a second configurator device, wherein the same configurator private signing key and the same configurator public verification key are shared among a plurality of configurators including the second configurator device to enroll different enrollee devices with the network in accordance with the device provisioning protocol.

16. The apparatus of claim 15, wherein the processor is further configured to encrypt the configurator key package using an encryption key that is different from the configurator private signing key.

17. The apparatus of claim 15, wherein the processor is further configured to:
    encrypt the configurator private signing key using a private key encryption technique; and
    include an indication of the private key encryption technique in a header of the configurator key package.

18. The apparatus of claim 15, wherein the processor is further configured to generate a digital envelope that includes the configurator key package and decryption information, and wherein the decryption information enables the second configurator device to decrypt at least the portion of the configurator key package.

19. The apparatus of claim 15, wherein the processor is further configured to:
    retrieve the backup of the configurator key package from the storage location;
    decrypt at least the portion of the configurator key package; and
    obtain the configurator private signing key from the configurator key package.

20. The apparatus of claim 15, wherein processor is further configured to:
- determine a location address of configurator key package at the storage location; and
- provide the location address to the second configurator device.

21. The apparatus of claim 15, wherein processor is further configured to provide decryption information to the second configurator device, and wherein the decryption information enables the second configurator device to decrypt at least the portion of the configurator key package and obtain the configurator private signing key.

22. The apparatus of claim 21, wherein the decryption information includes at least one member selected from a group consisting of a location address of the configurator key package at the storage location and an encryption key that is usable to decrypt at least the portion of the configurator key package.

23. The apparatus of claim 21, wherein the processor is further configured to provide the decryption information using at least one member selected from a group consisting of a display, a speaker, a light signal, a sensor interface, and a short-range radio frequency interface of the first configurator device.

24. A wireless communication device for use in a first configurator device of a network, comprising:
- at least one modem;
- at least one processor communicatively coupled with the at least one modem; and
- at least one memory communicatively coupled with the at least one processor and storing processor-readable code that, when executed by the at least one processor in conjunction with the at least one modem, is configured to:
  - implement a device provisioning protocol in which the first configurator device is configured to use a configurator private signing key to enroll an enrollee device with the network;
  - generate a configurator key package that includes at least the configurator private signing key associated with the first configurator device;
  - encrypt at least a portion of the configurator key package; and
  - store the configurator key package at a storage location as a backup for subsequent restore by a second configurator device, wherein the same configurator private signing key and the same configurator public verification key are shared among a plurality of configurators including the second configurator device to enroll different enrollee devices with the network in accordance with the device provisioning protocol.

25. The wireless communication device of claim 24, wherein the processor-readable code, when executed by the at least one processor, is configured to:
- encrypt the configurator private signing key using a private key encryption technique; and
- include an indication of the private key encryption technique in a header of the configurator key package.

26. The wireless communication device of claim 24, wherein the processor-readable code, when executed by the at least one processor, is configured to:
- retrieve the backup of the configurator key package from the storage location;
- decrypt at least the portion of the configurator key package; and
- obtain the configurator private signing key from the configurator key package.

27. A mobile station comprising:
- a wireless communication device for use in a first configurator device of a network comprising:
  - at least one modem;
  - at least one processor communicatively coupled with the at least one modem; and
  - at least one memory communicatively coupled with the at least one processor and storing processor-readable code that, when executed by the at least one processor in conjunction with the at least one modem, is configured to:
    - implement a device provisioning protocol in which the first configurator device is configured to use a configurator private signing key to enroll an enrollee device with the network;
    - generate a configurator key package that includes at least the configurator private signing key associated with the first configurator device;
    - encrypt at least a portion of the configurator key package; and
    - store the configurator key package at a storage location as a backup for subsequent restore by a second configurator device, wherein the same configurator private signing key and the same configurator public verification key are shared among a plurality of configurators including the second configurator device to enroll different enrollee devices with the network in accordance with the device provisioning protocol;
- at least one transceiver coupled to the at least one modem;
- at least one antenna coupled to the at least one transceiver to wirelessly transmit signals output from the at least one transceiver and to wirelessly receive signals for input into the at least one transceiver; and
- a housing that encompasses the at least one modem, the at least one processor, the at least one memory, the at least one transceiver and at least a portion of the at least one antenna.

* * * * *